(12) United States Patent
Saed

(10) Patent No.: US 7,706,437 B2
(45) Date of Patent: *Apr. 27, 2010

(54) FREQUENCY DOMAIN EQUALIZER FOR WIRELESS COMMUNICATIONS SYSTEM

(76) Inventor: Aryan Saed, H51 1255 Riverside Dr., Port Coquitlam, BC (CA) U38 7W5

( * ) Notice: Subject to any disclaimer, the term of this patent is extended or adjusted under 35 U.S.C. 154(b) by 0 days.

This patent is subject to a terminal disclaimer.

(21) Appl. No.: 12/050,144

(22) Filed: Mar. 17, 2008

(65) Prior Publication Data
US 2008/0219340 A1 Sep. 11, 2008

Related U.S. Application Data

(63) Continuation of application No. 10/661,147, filed on Sep. 12, 2003, now Pat. No. 7,362,802.

(51) Int. Cl.
*H03H 7/30* (2006.01)

(52) U.S. Cl. ............... 375/229; 375/232; 375/326; 375/324

(58) Field of Classification Search ............ 375/229, 375/232, 326, 324, 316
See application file for complete search history.

(56) References Cited

U.S. PATENT DOCUMENTS

| | | | |
|---|---|---|---|
| 6,327,302 B1 | 12/2001 | Shen | |
| 6,389,062 B1 | 5/2002 | Wu | |
| 6,567,480 B1 | 5/2003 | Brardjanian et al. | |
| 2003/0128751 A1 | 7/2003 | Vandenameele-Lepla | |
| 2003/0210645 A1 | 11/2003 | Gummadi et al. | |
| 2004/0109508 A1 | 6/2004 | Jeon et al. | |

FOREIGN PATENT DOCUMENTS

| | | |
|---|---|---|
| EP | 0877526 | 11/1998 |
| EP | 1063824 | 12/2000 |
| JP | 2000-165346 | 6/2000 |
| JP | 2001-069119 | 3/2001 |
| JP | 2002-064412 | 2/2002 |
| JP | 2002-344413 | 11/2002 |
| JP | 2003-283454 | 3/2003 |
| JP | 2003-313628 | 6/2003 |
| JP | 2004-153831 | 5/2004 |
| WO | 9839872 | 9/1998 |

(Continued)

OTHER PUBLICATIONS

Sliskovic; Carrier and Sampling Frequency Offset Estimation and correction in Mulitcarrier Systems; IEEE 2001.

(Continued)

*Primary Examiner*—Temesghen Ghebretinsae
(74) *Attorney, Agent, or Firm*—Stolowitz Ford Cowger LLP

(57) ABSTRACT

The present invention relates to wireless communications and is particularly applicable to devices and modules for correcting errors introduced to a wireless signal after its transmission. An equalizer is provided which compensates for undesirable effects on received radio signals introduced by either signal processing or by the transmission medium. In operation, the equalizer multiples the complex received signal with a complex corrective signal that compensates for these effects. A tap corrective signal corrects for time-varying channel effects (i.e. channel distortions), a timing tracking signal corrects for carrier frequency offset errors, and a phase tracking signal corrects for sampling frequency offset errors.

40 Claims, 8 Drawing Sheets

FOREIGN PATENT DOCUMENTS

| | | |
|---|---|---|
| WO | 03028329 | 4/2003 |
| WO | 03049390 | 6/2003 |

OTHER PUBLICATIONS

Lei et al.; Improved Joint Carrier and Sampling Frequency Offset Estimation Schemem for OFDM Systems; Globecom, IEEE 2003.
International Search Report for PCT/CA2004/001564; Jan. 25, 2005.
European Patent Office; EP 0476 1728, Supplementary European Search Report; Feb. 18, 2009; 3 Pages.
Bahai et al.; "Multi-Carrier Digital Communications"; Jan. 1, 1999; (XP-002515817); 8 Pages.
Xianbin Wang et al.; "SER Performance Evaluation and Optimization of OFDM System with Residual Frequency and Timing Offsets fro Imperfect Synchronization"; IEEE Transactions on Broadcasting, IEEE Service Center, Piscataway, NJ, vol. 49, No. 2; Jun. 1, 2003; (XP-011070313); 8 Pages.

FREQUENCY DOMAIN EQUALIZER FOR WIRELESS COMMUNICATIONS SYSTEM

RELATED APPLICATIONS

This application is a continuation of and claims priority to pending U.S. patent application Ser. No. 10/661,147, filed on Sep. 12, 2003 all of which is incorporated herein.

BACKGROUND OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever 1. Field of Invention The present invention relates to wireless communications and is particularly applicable, but not limited to, devices and modules for correcting errors introduced to a wireless signal after its transmission.

2. Description of the Related Prior Art

The ongoing revolution in communications technology has led to advances in wireless or radio technology. Wireless technology is currently being used in such disparate fields as wireless computer networks and wireless telephony. One technology which has been favoured for these applications is called Orthogonal Frequency Division Multiplexing (OFDM). As will be appreciated by those in the art, Frequency Division Multiplexing (FDM) involves using different frequencies to carry different signals, but this normally also involves providing a large "guard band" between the different frequencies. With OFDM, intersymbol interference (ISI) or interference between the different signals due to the closeness of their carrier frequencies is reduced as a special set of signals is used to build the transmitted composite signal. As a result of this feature, smaller guard bands are required and a more efficient use of bandwidth/resources can be achieved.

While OFDM has been successful in increasing the amount of data which is now transmitted over wireless links, much like any wireless technology, it is still subject to the limitations of the medium. Since signals are transmitted by radio waves, these signals may still suffer from not only distortions introduced by the act of transmission itself, but also from possible errors introduced by signal processing. Time-varying channel distortions, residual carrier frequency offsets, and residual sampling frequency offsets can distort and corrupt each OFDM signal.

A time domain OFDM signal consists of frames of samples corresponding to the data symbols (data frames), each frame preceded by a cylic prefix of known length (a guard frame). At the input of the Fast Fourier Transform (FFT), the time domain signal is framed in accordance with the positioning of the data and guard frames in the signal.

Referring to FIG. 1, in a typical operating environment, transmitted radio waves comprise of a number of subcarrier signals are reflected off various surfaces. As a result, the signal received at a base station may come from different directions (depending on reflections) with different strength (depending on attenuations), and the receiver sees only the combinations of all these reflections. This phenomenon is called multipath. The main problem of multipath is that it creates delay spread. Depending on the number of reflections and the propagation speed in different signals, all these signals generally do not arrive exactly at the same time at the receiver. The main technique to overcome delay spread is equalization. An equalizer attempts to invert or correct the effects of transmission distortion and signal processing errors. More specifically, an equalizer is a digital circuit that attempts to estimate the distortion due to the signal propagation through different paths, which effects each component's relative timings, phase and strength. The equalizer estimates the distortion and removes the distortion. A digital equalizer is often implemented as a time-domain digital finite response filter (FIR) adaptive taps, or as a frequency domain filter with an adaptive tap for each frequency point of concern.

More specifically, under the IEEE 802.11a standard relating to low power wireless devices, a data symbol baring 64 samples is preceded by a 16 sample cyclic prefix, yielding a total of 80 samples. A 64-point FFT is applied to a frame of 64 samples (an FFT frame). To reduce inter-symbol-interference, an FFT framing offset with respect to the start of the data frame is applied. With an FFT framing offset of 5 samples, the FFT frame of length 64 would then start at the $12^{th}$ sample of the guard frame and end at the $59^{th}$ sample of the data frame.

An FFT offset is, in fact, a negative delay of the FFT frames with respect to the data frames. When applied during channel estimation, the offset therefore introduces a phase rotation corresponding to that delay, a rotation which is in addition to any other phase and gain distortion already present in the channel without the delay. It is the sum of these distortions which an equalizer attempts to correct. The channel distortions include distortion due to multipath, as well as distortions due to the analogue and digital signal processing in the transmitter and receiver.

The phase rotation due to the delay causes a linear distortion on the real and imaginary components of each subcarrier's channel estimate, which makes channel estimate smoothing difficult if not impossible.

Equalizers for wireless communications systems are known in the art. For example, U.S. Pat. No. 6,327,302 entitled "Systems and Methods of Digital Wireless Communication Using Equalization" issued Dec. 4, 2001 and assigned to Ericsson Inc., describes a method and apparatus to accomplish fast adaptive equalization of a wireless communication channel utilizing time varying adaptive filter coefficients and convergence parameters. Although the technique described in this patent for a time domain equalizer works adequately, it is focused solely on overcoming channel distortions and does not address possible errors introduced by residual carrier frequency offsets, and residual sampling frequency offsets.

Another prior art equalizer is described in U.S. Pat. No. 6,389,062 entitled Adaptive Frequency Domain Equalizer Circuits, Systems and Methods For Discrete Multitone Based Digital Subscriber Line" issued May 14, 2002 and assigned to Texas Instruments Inc. This patent illustrates a channel equalization system using a combined frequency domain equalizer for use in a digital subscriber line (DSL) modem. The system adjusts for amplitude and phase distortions in a received signal but does not does not address possible errors introduced by residual carrier frequency offsets, and residual sampling frequency offsets. It is also not adapted for a wireless network utilizing OFDM.

Based on the above, there is therefore a need for a device which overcomes channel distortions and compensates for possible errors introduced by residual carrier frequency offsets and residual sampling frequency offsets. Ideally, such a device can compensate for all three deleterious effects, while being self-contained and monolithic. deleterious effects, while being self-contained and monolithic.

SUMMARY OF THE INVENTION

The present invention provides a frequency domain equalizer which compensates for undesirable effects on received radio signals introduced by either signal processing or by the transmission medium. In operation, the equalizer multiples the complex received signal after transformation into the frequency domain with a complex corrective signal that compensates for these effects. A time-varying tap corrective signal corrects for time-varying channel effects (i.e. channel distortions), a timing tracking signal corrects for sampling frequency offset errors, and a phase tracking signal corrects for carrier frequency offset errors. The tap corrective signal is generated by calculating an initial tap value and applying a sign least mean squares (LMS) process or algorithm to the received signal while both the phase tracking signal and the timing tracking signal are derived from the pilot tones of each OFDM data symbol. Separate phase tracking and timing tracking circuits produce the phase tracking and timing tracking corrective signals.

In accordance with one aspect of the invention, there is provided a frequency domain equalization system to compensate for wireless communication time-varying channel effects, residual carrier frequency offset and sampling frequency offset arising in a received complex signal comprising: an equalizer tap calculation circuit cooperating with an equalizer tap tracking circuit for correcting the time-varying channel effects; a phase tracking circuit for correcting the residual carrier frequency offset; and a timing tracking circuit for correcting the sampling frequency offset, wherein the received complex signal is inputted from a Fast Fourier Transform (FFT) circuit and a corrected complex signal is outputted to a soft decision mapper; and wherein a corrective tap signal is produced in the equalizer tap calculation circuit for use in correcting the complex signal; and wherein four pilot signals are generated for use in the phase and timing tracking circuits.

In accordance with another aspect of the invention there is provided in a wireless communications system, a method of correcting a received complex signal comprising: estimating a channel response from long sequence training symbols FFT 1 and FFT 2 contained in a received data packet preamble; processing pilot tones in successive data symbols associated with the FFT 1 and FFT 2 long sequence training symbols to evaluate carrier frequency offset and sampling frequency offset; compensating for any of the carrier frequency or sampling frequency offset in said next received data packet; tracking channel distortion during subsequent reception of data packets; and modifying the channel response to compensate for any detected distortion.

The advantage of the present invention is now readily apparent. An equalizer with integrated timing recovery and phase tracking is provided which operates in the frequency domain.

BRIEF DESCRIPTION OF THE RELATED PRIOR ART

A better understanding of the invention will be obtained by considering the detailed description below, with reference to the following drawings in which:

FIG. 8(*b*) depicts the phase predictor circuit integral to the phase tracking circuit of FIG. 8(*a*)

DESCRIPTION OF THE PREFERRED EMBODIMENT

Figure 2:
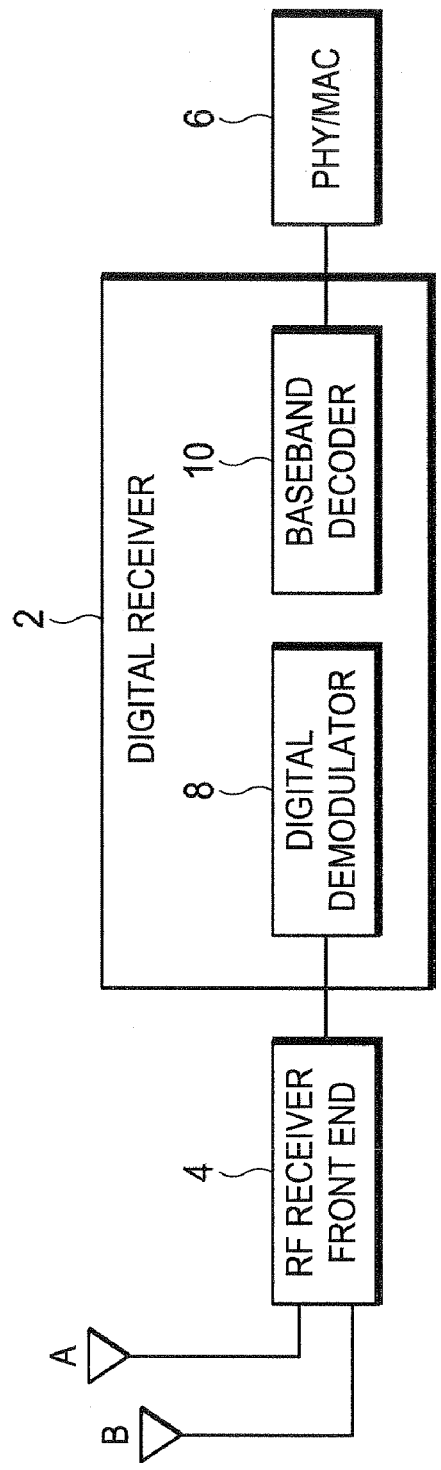
FIG. 2 depicts a block diagram of a digital receiver in accordance with the present invention.

Referring to FIG. 2, there is depicted a digital receiver 2 in which the present invention is housed. The preferred digital receiver 2 may be, for example, the ICE5350 Digital Receiver offered by IceFyre Semiconductor Inc. which performs all the physical layer functions defined in the IEEE 802.11a standard, but the invention is not meant to be limited to this receiver. The digital receiver 2 is located between the RF Receiver Front End 4 and the Physical Medium Access Control (PHY/MAC) 6. The RF Receiver Front End connects to antennae A and B. As shown in the drawing, the two main blocks within the digital receiver 2 are the digital demodulator 8 and the baseband decoder 10. The digital demodulator 82 recovers the baseband signal by removing carrier offsets, timing offsets, compensating for the channel impairments and demapping the digitally modulated signal. This block is located between the analog-to-digital interface (not shown) and the baseband interface (not shown). The baseband decoder 10 de-interleaves the baseband signal, provides error correction through the soft-decision Viterbi algorithm and unscrambles the corrected bit stream to be passed through the PHY/MAC 6. This block is located between the baseband interface (not shown) and the PHY/MAC interface (not shown).

Figure 1:
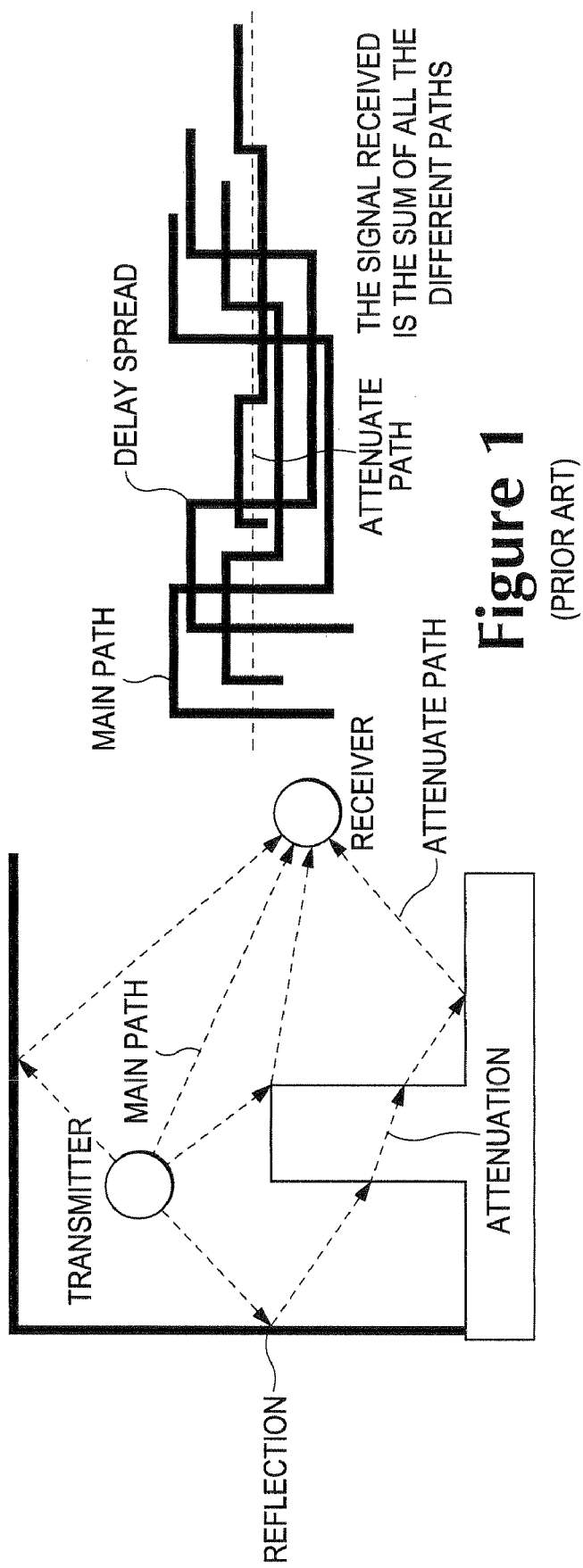
FIG. 1 depicts multipath and delay in a wireless system.
Figure 3:
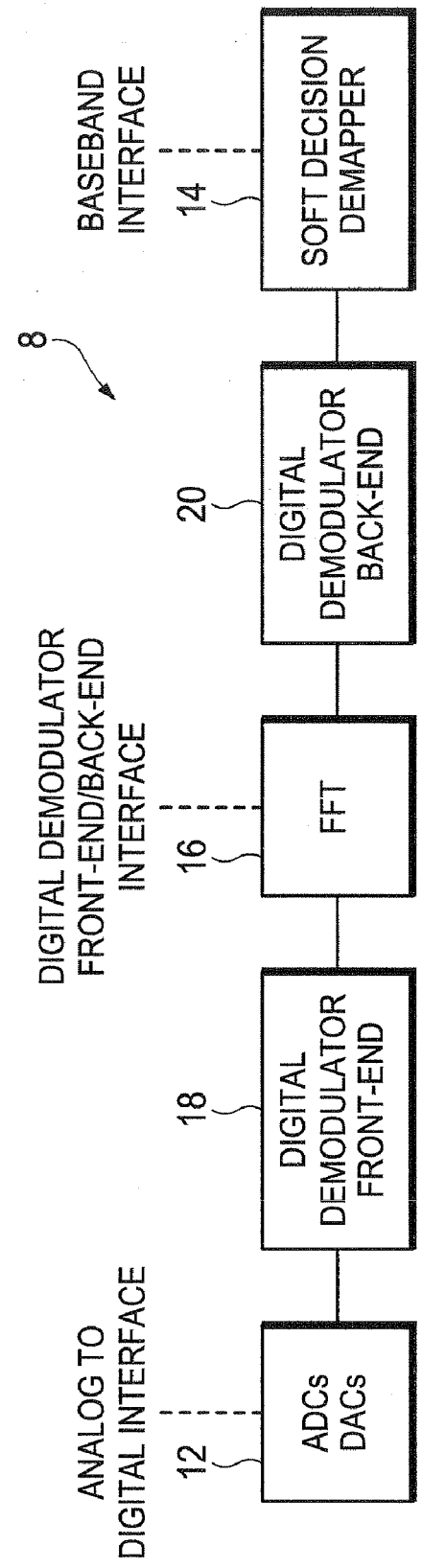
FIG. 3 depicts a block diagram of a digital demodulator integral to the digital receiver of FIG. 2.

FIG. 3 depicts the digital demodulator 8 of FIG. 1. As shown in the diagram, the analog to digital interface is located at block ADCs/DACs 12. The baseband interface can also be seen in the figure at the soft decision demapper 14. It can also be seen in the figure that the digital demodulator 8 is distinctly divided into two parts by the Fast Fourier Transform (FFT) circuit 16. To the left is the digital demodulator front-end (DFE) 18, while to the right is the digital demodulator back-end (DBE) 20. The invention of the present invention is provided in the digital demodulator back-end 20.

Figure 4:
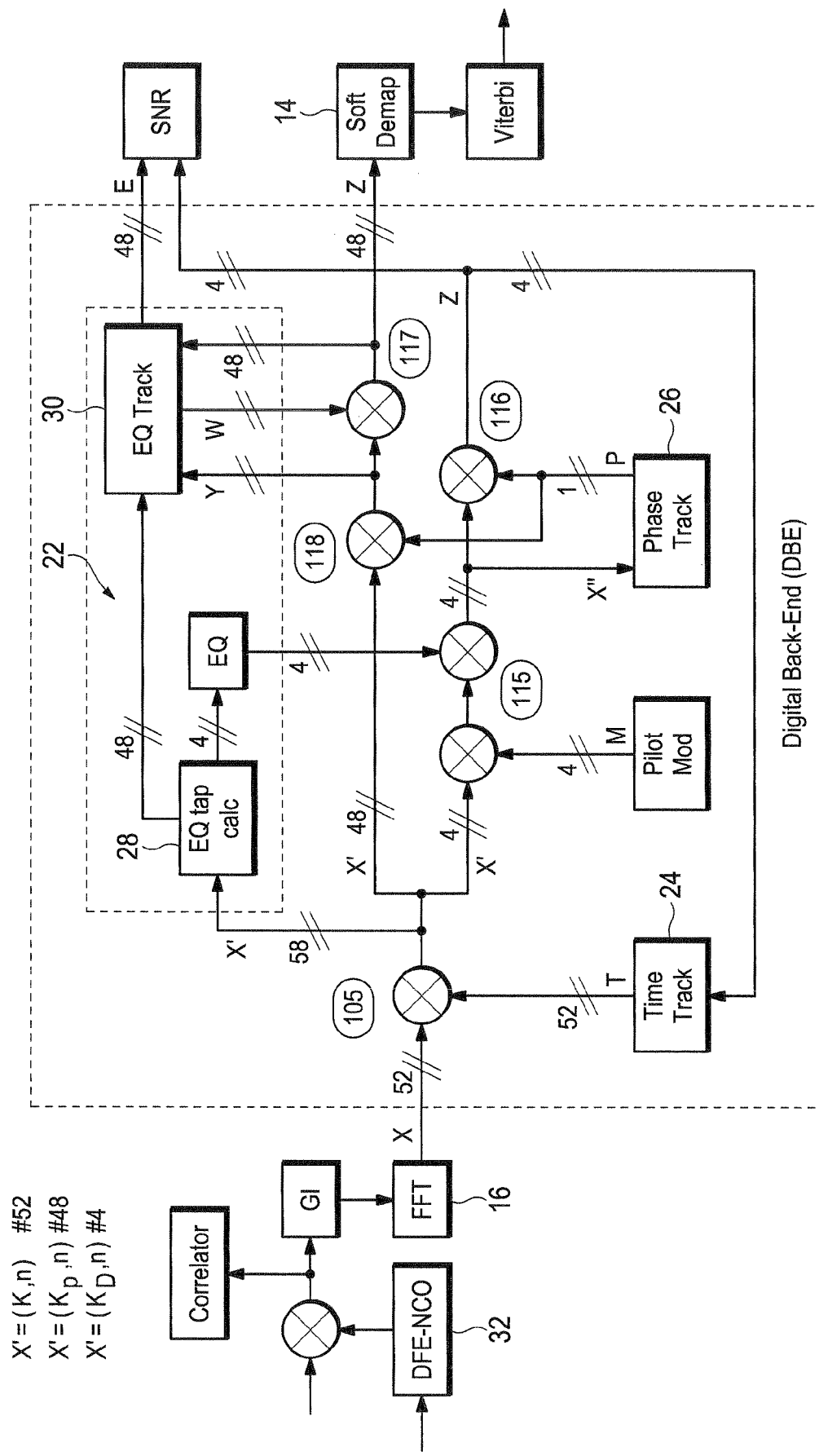
FIG. 4 depicts a block diagram of a digital demodulator back end integral to the digital demodulator of FIG. 3.

Referring to FIG. 4, an overview of the DBE is depicted. The DBE performs all digital signal processing (DSP) functions from the FFT circuit 16 output to the soft decision demapper 14 input. As will be more fully described below, in particular, the DBE functions as an equalizer (EQ) (depicted generally at 22) with integrated timing and phase tracking circuitry (depicted at 24 and 26 respectively). As can be seen in the Figure the phase tracking circuit 26 is nested with the timing tracking circuit 24. All of this functionality is accomplished completely in the frequency domain i.e. after the FFT circuit 16. This is advantageous as the control signals are more easily derived from the frequency domain, where the pilot signals are readily available to reveal phase and timing error i.e. they are a product of the FFT circuit 16. Applying the correction after the FFT circuit 16 also servers to avoid the latency of the FFT circuit 16. As shown in the drawing, the equalizer also includes equalizer tap calculation circuitry 28 and equalizer tap tracking circuitry 30.

In general, the equalizer compensates each of 52 complex subcarriers of each OFDM symbol for time-varying channel effects, residual carrier frequency offset and residual sampling frequency offset. It accomplishes these functions by estimating an initial channel response from the complex data received in two symbols transmitted in the long sequence training preamble of a data packet. It then processes four pilot tones in each successive data symbol to evaluate carrier frequency offset and sampling frequency offset. Any detected offsets result in the next received symbol being compensated for the above effects. During data packet reception the equalizer tracks changing channel distortion and modifies the calculated taps (discussed below) to minimize the error for each subcarrier received. The 52 complex subcarriers are received from the FFT circuit 16 and after equalization presents the equalized subcarriers to the soft decision dempapper 18 in time-division multiplexed even and odd, in-phase and quadrature subcarrier data buses.

Figure 5:
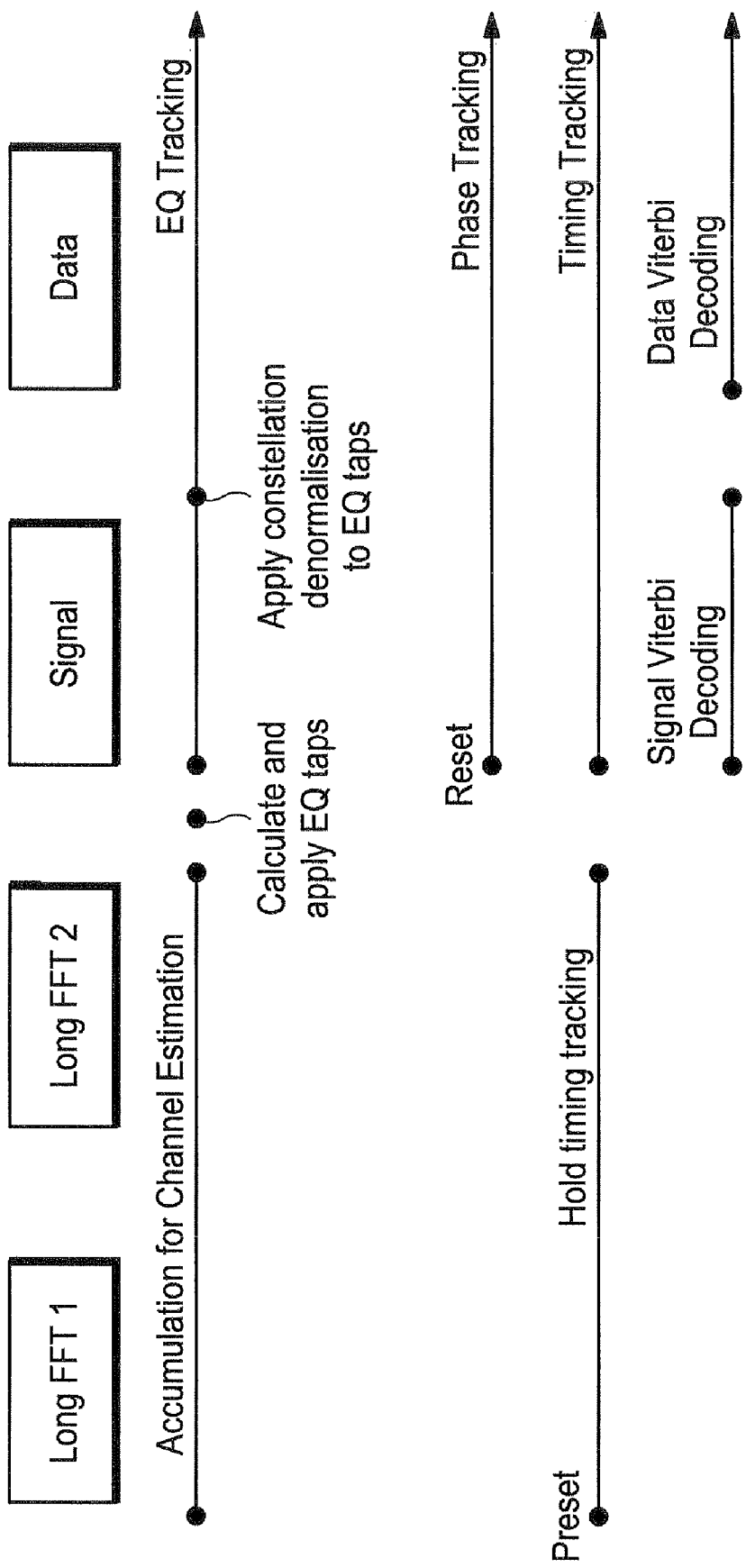
FIG. 5 depicts a timing overview of the equalization process integral to the present invention.

Referring to FIG. 5, a timing overview of the equalizer of the present invention is provided. The FFT load signals repeat every 80 clock periods. For a 20 Mhz clock, this time represents the symbol period of the received OFDM data. The first symbol that is processed is FFT 1 of the long sequence training symbol, followed by FFT 2 of the long sequence training symbol. The complex subcarriers of these two symbols are averaged on a per subcarrier basis, then presented to the equalizer tap calculation circuit 28 within the equalizer for initial channel estimation and tap initialization. Each subcarrier has one associated complex tap that, once initialized, is used to correct for static and time-varying channel effects. The tap corrective signal is generated by calculating an initial tap value and applying a least mean squares (LMS) process or algorithm to the received subcarriers. The taps are used to correct the FFT subcarrier data starting with the SIGNAL symbol. Within the timing-tracking circuit 24, the timing-tracking calculations are initialized at the beginning of each packet. The 52 complex timing-tracking offset correction values are preset based on the FFT framing offset, and hence the offset is transparent to the eqalizer tap calculation circuit. Within the phase tracking circuit 26, the phase-tracking calculation is initialized at packet start by initializing a complex register value. During the SIGNAL symbol, four pilot tone subcarriers are extracted and reordered into subcarrier order. A phase tracking rotor is calculated from these four pilot tone subcarriers and applied to the next data symbol. The timing-tracking calculations also calculate new timing-tracking offset correction values (in the form of a time tracking rotor) from the same four pilot tone subcarriers and apply these values to the next data symbol on a subcarrier basis.

Figure 6:
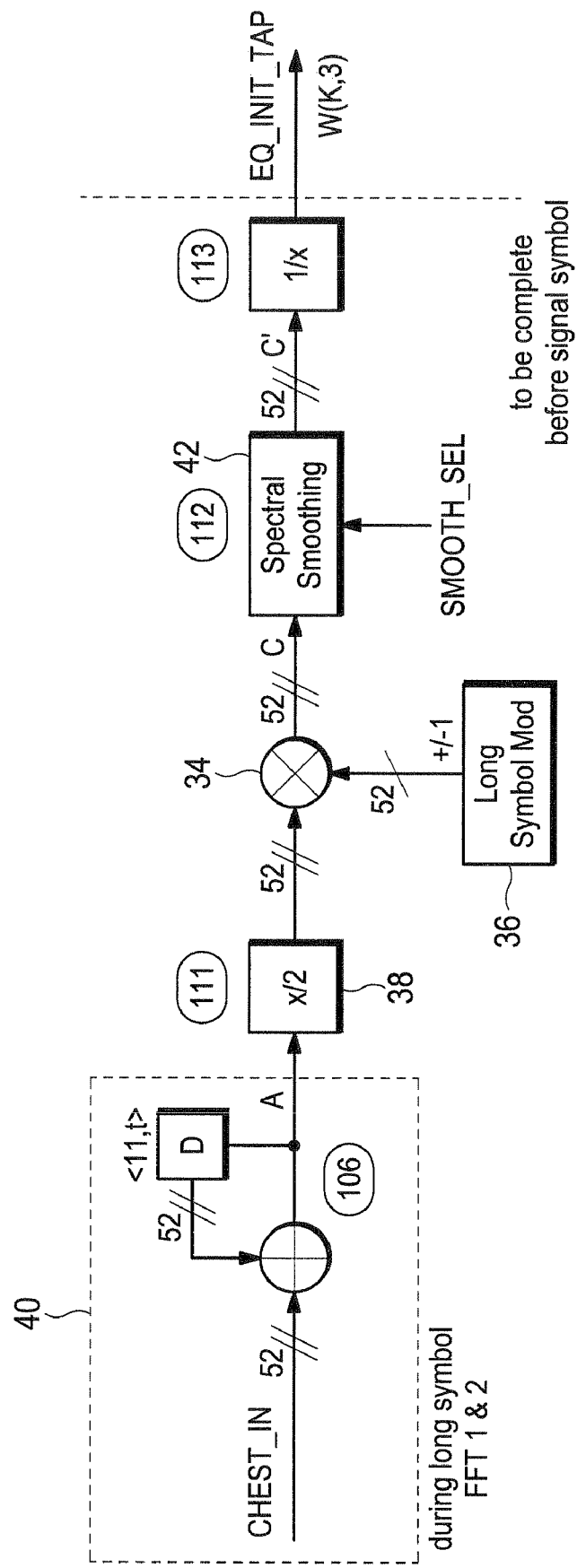
FIG. 6 depicts the equalizer tap calculation (channel estimation) circuit.

With respect to the equalizer tap calculation, the amplitude and phase distortion as seen by the equalizer tap calculation circuit 28 in each data and pilot subcarrier translate to equalizer tap values. Tap values are the complex inverse of the channel estimate. The complex inverse returns inverse amplitude and a conjugate angle. Referring to FIG. 6, greater detail of the equalizer tap calculation circuit 28 is given. Channel estimation is performed by comparing (at 34) the received amplitude and phase of the transmitted long symbol 36 with a reference amplitude and phase which is the local replica of the long symbol at the receiver. Comparison is performed by multiplying (demodulating) (at 38) the received value in each subcarrier with the local long symbol. Averaging (at 40) over FFT 1 and FFT 2 precedes the multiplication (at 38), in order to enhance the estimate under zero-mean noise conditions.

Further enhancement of the estimate is obtained through spectral smoothing (at 42). Since the degree of correlation of noise between subcarriers is well below the degree of correlation of the channel phase and magnitude between subcarriers, an averaging across subcarriers provides additional enhancement. Spectral smoothing is performed through three-tap or five-tap complex moving average across the data and pilot subcarriers, with special consideration of the band edges. Under some harsh conditions, whereby deep nulls cause severe linear distortion, smoothing may, to some degree, have an adverse effect. Under such circumstances, no smoothing or smoothing with only three taps is preferable. In contrast, under flat channel conditions, smoothing delivers significant improvement and five taps are preferred. The smoothing circuit can be programmed to allow for such selections. Any non-zero symbol delay (i.e. FFT framing offset) after symbol framing at the input to the FFT circuit 16 will emerge as a phase rotation of the estimated spectrum. A phase rotation manifests itself as a cosine and sine shaped distortion, and a spectrum that is otherwise sufficiently fit for smoothing, becomes unfit. Since a significant share of the non-zero symbol delay is known and intentional, appropriate timing correction is applied to the input to the channel estimator. This correction is performed by the timing recovery circuit, when it is preset and held during the long symbol.

Figure 7:
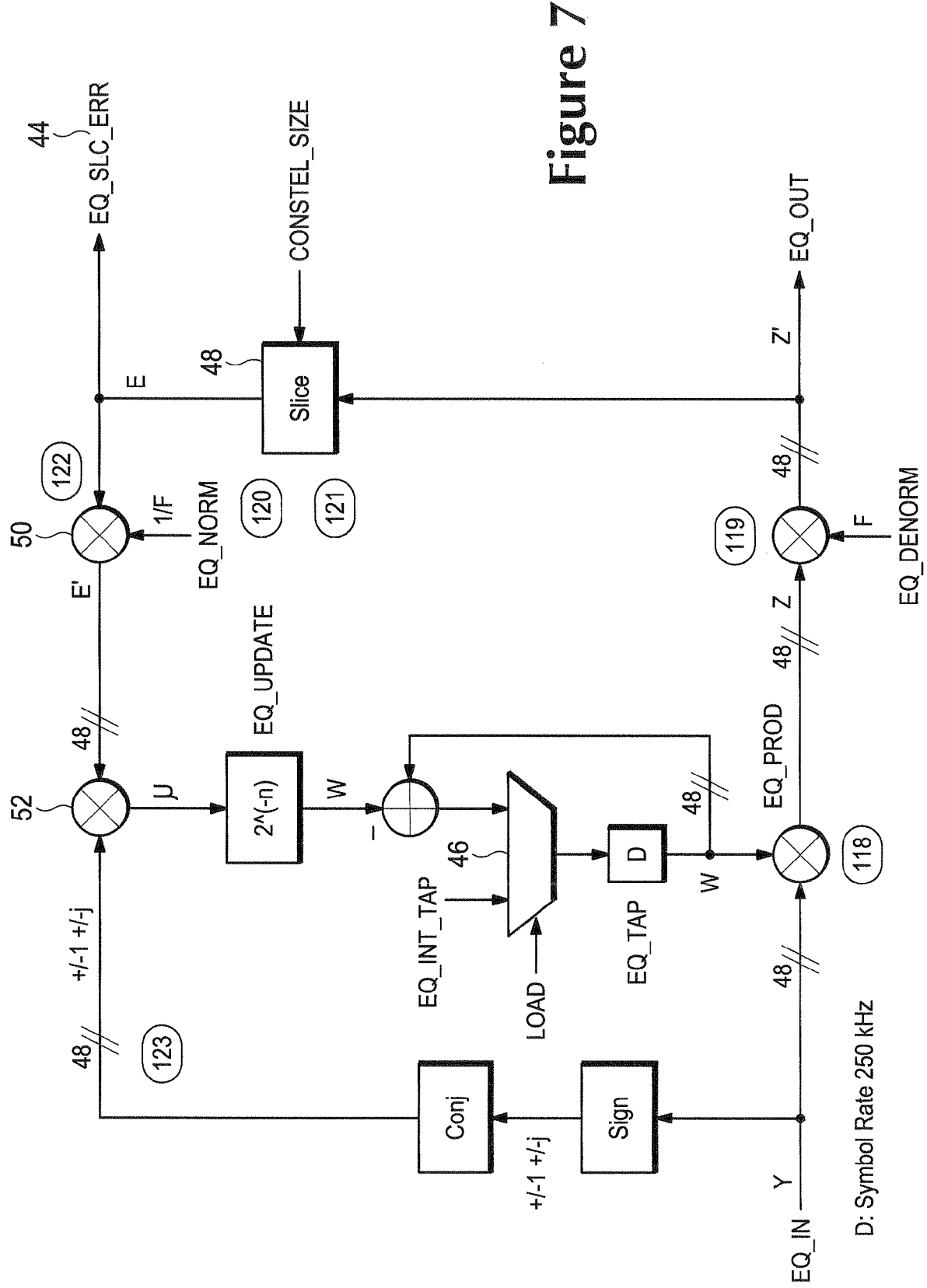
FIG. 7 depicts the equalizer tap tracking circuit.

Referring to FIG. 7, the equalizer tap tracking circuit 30 is more fully depicted. The function of the equalizer tap tracker 30 is to refine tap values, track residual phase and timing error, and track channel variations. Tap updating is performed with a running time average of a slicer error (shown at 44). The tap update allows the equalizer to adjust the taps to an expanding and diminishing constellation, as well as a rotating constellation. It compensates for phase lag and amplitude distortions by the timing and phase tracking circuits to be discussed later. It also refines (at 46) the initial tap values obtained from channel estimation, a typically imperfect estimation due to noise. Tap tracking can be turned on and off as required. The signal that drives the tap values is provided by the slicer 48. At each symbol and for each data subcarrier, the slicer 48 returns the complex difference (error) between the constellation value at its input and the nearest odd integer constellation point corresponding to the applicable constellation size. This error is normalized (at 50) based on the constellation size prior to being used for updating (at 52) the tap value. Time averaging is essential to reduce tap jitter, and such averaging is accomplished through scaling of the normalized slicer 48.

Figure 8B:
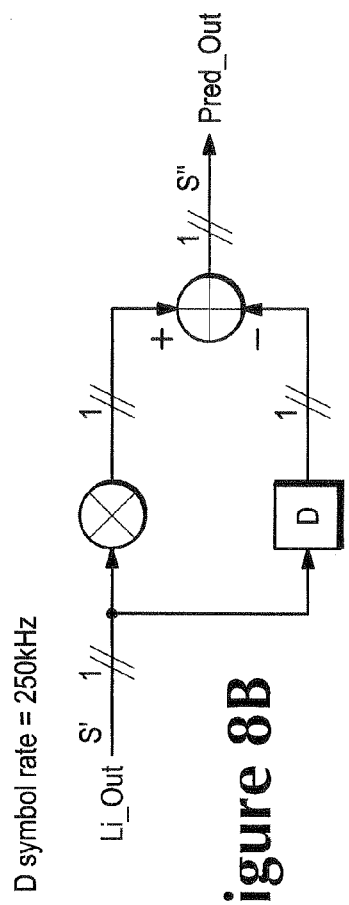
FIG. 8(*a*) depicts the phase tracking circuit.
Figure 8A:
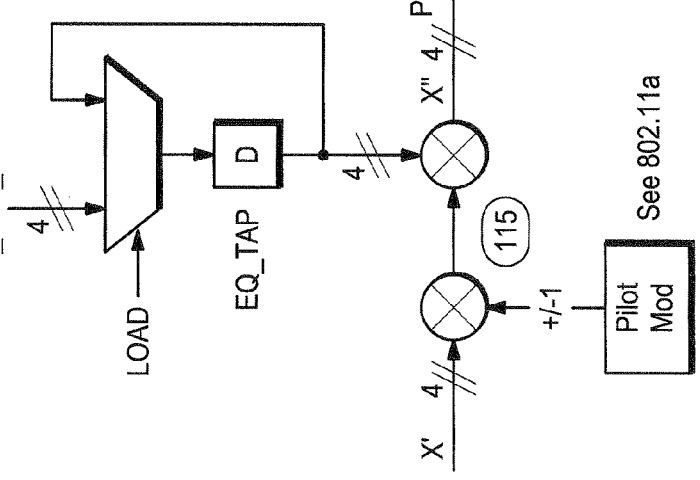

FIG. 8(a) depicts in greater detail the phase tracking circuit 26, while FIG. 8(b) depicts a phase predictor circuit integral to the phase tracking circuit 26. The purpose of the phase tracking circuit 26 is to correct for residual carrier frequency offset, after adjustments by the digital front-end numerically controlled oscillator (DFE-NCO) (shown as 32 in FIG. 4). Residual offsets are a result of inaccurate offset estimations during the short symbol and the long symbol in the preamble. The DFE-NCO corrects sufficiently for the FFT, yet additional correction after the FFT is needed, especially for packets of intermediate to maximum length, and packets with higher density constellations. The phase error causes the constellations to rotate up to a few degrees per symbol. Although the equalizer would be capable of tracking this residual rotation, phase tracking using four pilots is more robust under noisy conditions. The equalizer adaptation is thus capable of operating with a time constant too slow to track the phase error. The circuit tracks the phase across the four equalized pilots 54 using time averaging (at 56) and averaging across the pilots as well as phase prediction (at 58). Importantly, the pilot equalizer taps do not adapt, and hence the rotation is entirely visible to the phase tracking circuit. For correction, a rotor 60 which represents the reverse drift is applied to the pilot and data subcarriers in a feed forward manner.

Figure 9:
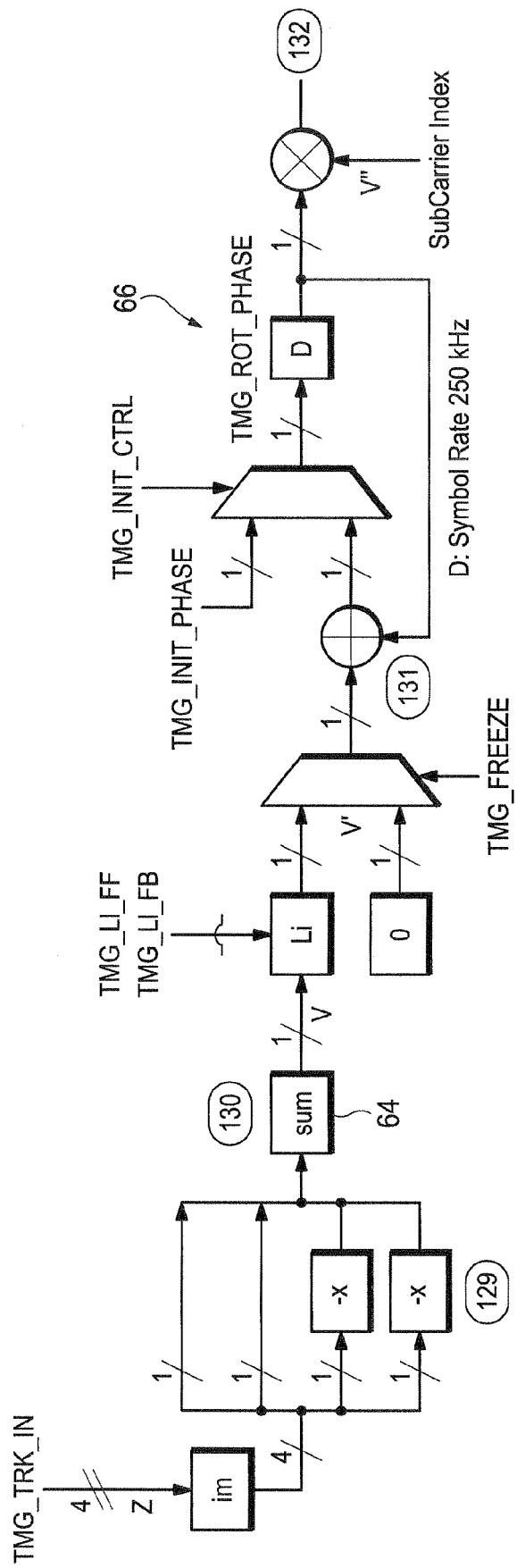
FIG. 9 depicts the timing tracking circuit.

Referring to FIG. 9, the timing tracking circuit 24 is depicted. The function of this circuit is to track timing error due to sampling frequency offset. The received signal is sampled at the ADC 12 (FIG. 3) with a clock derived from the device clock (not shown) of the digital receiver 2 (FIG. 2). A difference in clock frequency between the clock used for transmission and the clock used for sampling in the receiver, manifests itself as a stretching or shrinking of the received baseband spectrum. This stretch or shrinkage causes a subcarrier frequency offset, which increases with the distance of the subcarrier from direct current. Such a timing offset causes a phase rotation similar to that of a carrier frequency offset, but the speed of the offset varies per subcarrier. This timing error causes the constellations to rotate up to 0.5 degrees per symbol in the outer most carrier.

Although the equalizer would be capable of tracking this residual rotation, timing tracking using four pilots is more robust under noisy conditions. The equalizer adaptation is thus capable of operating with a time constant too slow to track the timing error. The circuit tracks the phase across the four equalized pilots using time averaging (at 64) across the pilots. Importantly, the pilot equalizer taps do not adapt, and hence the rotation is entirely visible to the phase tracking circuit 26. For correction, a main rotor phase (at 66) which represents the reverse timing drift, is used as the basis for calculating an individual rotor phase for each subcarrier. The individual rotors are applied to the pilot and data subscribers in a feed back manner. The timing tracking circuit is also used to undo the phase rotation due to an intentional FFT framing offset into the guard interval. Correction of the phase before the equalizer tap calculation is required for the spectral smoothing circuit. The initial phase of the main rotor is read from a register, and it is not updated by the circuit during the long symbol. Thereafter, the timing tracking circuit will update the rotor.

As will be appreciated by those in the art, within the frequency domain, a complex FFT output can be represented by X(K,n) where time n=1 ... N OFDM FFT frames (OFDM symbols), including training symbols, and where K is the subcarrier index. More specifically, in accordance with IEEE 802.11a, active sub-carrier indices are frequency indices K=−26 ... 0 ... 26 (52 sub-carriers), among which pilot sub-carrier indices are $K_p$=−14,−7,7,14 (i.e. 4 pilots). Data sub-carrier indices are $K_D$=−26...−15, −13...−8, −6...−1, 1...6, 8...13, 15...26 (i.e. 48 data carriers). The training symbols consist of two FFT frames with fixed and known binary phase shift keying (BPSK) modulation in each subcarrier. Transmission of data symbols follows the transmission of training symbols.

The processing steps for channel estimation, adaptive equalization, and phase and timing tracking are will now be now explained in more detail with reference to FIGS. 4 and 6 to 9, where the circled numbers represent the portion of the depicted circuit where the steps defined below are performed:

102. For each subcarrier, initialize a complex timing correction T(K,n) based on the FFT framing offset: set T(K,1) =exp(−j 2 pi K d/M) whereby d is the FFT framing offset (samples, d>0) and M is the size of the FFT frame (samples). Typically M corresponds to the size of the FFT;

103. Reset a phase correction P(n):set P(1)=0;

104. For each subcarrier, reset a channel estimation accumulator A(K,n):set A(K,1)=0;

105. For each subcarrier, apply the timing correction to the output of the FFT X(K,n): X'(K,n)=T(K,n) X(K,n);

106. For each sub-carrier, accumulate the received training symbol: A(K,n)=A(K,n)+X'(K,n);

107. Maintain (freeze) the phase correction: P(n+1)=P(n);

108. Maintain (freeze) the timing correction: T(K,n+1)=T (K,n);

109. Increment the symbol counter: set n=n+1;

110. Repeat steps 105 to 109 for the duration of all training symbols. In the above the transmitted training symbols are assumed to be constant over time;

111. For each subcarrier, calculate a channel estimate C(K) =A(K,n)/L(k)/(n−1) whereby L(K) is the transmitted training symbol;

112. Optionally, smooth the channel estimate to obtain a spectrally smoothed channel estimate C'(K) for each subcarrier;

113. For each subcarrier calculate initial equalizer taps W(K,n)=1/C'(K).

113. For each subcarrier calculate initial equalizer taps W(K,n)=1/C'(K).

In IEEE 802.11a, the training symbols consist of two FFT frames in a so-called Long Symbol. Therefore, we proceed with n=3. Also, the training symbol L(k) is BPSK (values of +1 and −1) and therefore the division by L(K) in step 111 can be replaced by a multiplication with L(K), arriving at C(K) =A(K,n)L(k)/2.

(b) Perform the following processing related to the equalizer during reception of the data symbols:

114. For each subcarrier, apply the timing correction to the output of the FFT X'(K,n)=T(K,n) X(K,n);

115. Demodulate the pilot carriers with their known modulation $M(K_p, n)$, (again assuming that the modulation is BPSK, multiplication suffices) and apply the equaliser: $X''(K_p, n)=X'(K_p,n)M(K_p,n−)W(K_p,n)$;

116. For each pilot carrier apply the phase correction: $Z(K_p,n)=X''(K_p,n) P(n)$;

117. For each data carrier, apply the phase correction: $Y(K_D,n)=X'(K_D,n)P(n)$;

118. For each data carrier, apply the equalizer: $Z(K_D,n)=Y(K_D,n)W(K_D, n)$;

119. For each data carrier, apply a constellation denormalisation factor F: $Z'(K_D,n)=F Z(K_D,n)$;

120. For each data carrier, perform a hard decision based on the equalizer output $Z(K_D,n)$. This is accomplished by slicing the equalizer output based on the constellation at hand to obtaining the decision result $D(K_D,n)$. For instance, for a 16-Quadrature Amplitude Modulation (QAM—a combination of amplitude modulation and phase shift keying) subcarrier that is normalised to an average power level equaling one, the equalizer output is denormalised with a constellation denormalisation factor, which for 16-QAM equals {square root} {square root over (10)}, and slicing is performed based on real and imaginary decision boundaries at 0 and .+−0.2 while selecting the nearest ideal 16-QAM constellation point with ideal real component values of .+−0.1 and .+−0.3, and with ideal imaginary component values of .+−0.1 and .+−0.3. The 16 possible values for $D(K_D,n)$ are thus .+−0.1.+−0.1j, .+−0.1.+−0.3j, .+−0.3.+−0.3j and .+−0.3.+−0.1j;

121. For each data carrier, calculate a complex slicer error $E(K_D,n)$ whereby $E(K_D,n)=Z(K_D,n)−D(K_D,n)$;

122. For each data carrier, apply a constellation normalisation factor 1/F: $E'(K_D,n)=(1/F)E(K_D,n)$;

123. For each data carrier, calculate an equalizer tap update $w(K_D,n)$: $w(K_D,n)=E'(K_D,n)conj(sign(Y(K_D,n)))$ in which is an update parameter, the value of which is a tradeoff between speed and tap jitter. A suitable setting is conj(x) returns the complex conjugate of x, and sign(x) returns the complex sign of x, being .+−0.1.+−.j;

124. Update the equalizer taps for the data carriers: $W(K_D, n+1)=W(K_D,n)+w(K_D,n)$ As an alternative to the two multiplications for denormalization by F and normalization by 1/F, it is possible to incorporate factor F in the equalizer taps. This is performed when the modulation changes. For instance, after a BPSK symbol and before a subsequent 16-QAM symbol all equalizer taps are multiplied with {square root} {square root over (10)}. As can be seen in FIG. 4, the equalizer tap multiplier is present but the denormalization multiplier is absent. In this arrangement, the denormalization factor is incorporated in the equalizer taps. This is in contrast to FIG. 7 where two separate multiplications are performed for normalization and denormalization.

(c) Perform the following processing related to the phase correction during reception of the data symbols:

125. Calculate a common phase rotation by summing over the demodulated and equalised complex pilots: $S(n)=\text{sum}(X''(K_p,n))$ (i.e. sum for all $K_p$). For 802.11a this yields $S(n)=S(7,n)+S(14,n)+S(-7,n-)+S(-14,n)$;

126. Filter the common phase rotation with a complex Low Pass Filter, e.g. implemented by two Leaky Integrators (LI), one for the real part of S(n) and one for its imaginary part. The LI Initialize the LI with S'(2)=0;

127. Apply a predictor to reduce the impact of the Low Pass Filter delay: $S''(n)=2S'(n)-S'(n-1)$, 128. In preparation for the next iteration, update the phase correction to be the complex conjugate of the predictor output: $P(n+1)=\text{conj}(S''(n))$;

The above steps effectively update the phase of a phase correction rotor exp (−j), whereby phase is obtained by averaging the common phase error of the pilots.

(d) Perform the following processing related to the timing correction during reception of the data symbols:

129. For each pilot carrier at the input to the timing tracking circuit, determine the sign of its frequency index and then sum the imaginary parts of the pilots multiplied by the sign of their indices: $V(n)=\text{sum}(\text{imag}(Z(K_p,n))\text{sign}(K_p))$ (i.e. sum for all $K_p$ considering the sign of each value of $K_p$)

For 802.11a this yields $V(n)=\text{imag}(Z(7,n))+\text{imag}(Z(14,n))-\text{imag}(Z(-7,n-))-\text{imag}(Z(-14,n))$ Considering that the feedback timing correction keeps the timing error induced phase of the pilots at this point in the circuit small, the phase can be approximated by the sum of the imaginary component of the pilots.

Consider also that, for a given delay, the sign of the phase error for positive frequencies is negated in regards to the sign of the phase error for negative frequencies;

130. Filter the common phase rotation with a Low Pass Filter, e.g. a Leaky Integrator (LI) which is a first order IIR with coefficients and and apply a gain to obtain a phase increment V'(n) $V'(n)=V(n)+(1-)V'(n-1))$ The above arrangement allows each of the filter coefficients and the gain to be approximated by a power of two, removing the need for a fixed point multiplier in favour of a binary shifter. Suggested values are 131. Accumulate the phase increment to obtain the phase of the timing correction: $V''(n)=V''(n-1)+V'(n)$ Initialize with V''(3)=0;

132. In preparation for the next iteration, convert the phase to an individual conjugate rotor for each subcarrier: $T(K,n+1)=\exp(-jV''(n)K)$.

This step is best performed with a CORDIC circuit;

133. Increment the symbol counter: n=n+1; and

134. Repeat steps 114 to 133 for the duration of all data symbols.

In IEEE 802.11a the Long Symbol is followed first by a BPSK Signal Symbol before the data symbols. Within the context of the above, the Signal Symbol is to be treated as a data symbol.

The phase correction circuit ensures that the timing correction circuit is presented with demodulated pilots that are substantially void of a common phase error, allowing the extraction of a timing error related phase by summing the imaginary parts of the phasors while considering the sign of their frequency index.

The timing correction circuit ensures that the phase correction circuit as well as the timing correction circuit itself are presented with demodulated pilots that are substantially void of a timing error related pilot phase error, allowing the approximation of the timing error related pilot phase error by the imaginary component of the pilot phase.

The present invention may be implemented as a combination of both hardware and software. In particular, the present invention can be implemented as a series of computer readable instructions stored in a microprocessor—a digital signal processor (DSP) ideally suited to the numerically-intensive requirements of equalization as discussed above. The computer readable instructions may be programmed in a procedural programming language (e.g. "C") or an object oriented language (e.g. "C++"). The series of computer instructions embody all or part of the functionality previously described herein. Alternately, the present invention may be implemented entirely in hardware such as an integrated circuit for use in a digital receiver.

Embodiments of the present invention may also be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

I claim:

1. A compensation system comprising:
   a digital demodulator circuit configured to generate a corrected complex signal by correcting at least one error introduced into a complex signal during wireless transmission, the digital demodulator circuit comprising:
   an equalizer tap calculation circuit configured to cooperate with an equalizer tap tracking circuit to correct at least one of time-constant and time-varying channel effects of the complex signal;

a phase tracking circuit configured to correct a residual carrier frequency offset of the complex signal;

a timing tracking circuit configured to correct a sampling frequency offset of the complex signal;

where the digital demodulator circuit is configured to receive the complex signal from a Fast Fourier Transform (FFT) circuit;

where the digital demodulator circuit is configured to provide the corrected complex signal to a soft decision demapper; and where the equalizer tap calculation circuit is configured to generate a corrective tap signal to each subcarrier associated with the complex signal by applying an algorithm to a plurality of subcarriers comprising the complex signal.

2. The compensation system of claim 1 where the algorithm is a sign least mean squares algorithm.

3. The compensation system of claim 1 where the plurality of subcarriers comprise at least 52 subcarriers.

4. The compensation system of claim 1 where the equalizer tap calculation circuit is further configured to correct the complex signal responsive to at least one of the corrective tap signals.

5. The compensation system of claim 4 where the equalizer tap calculation circuit is further configured to update the corrective tap signal with a running time average of a slicer error.

6. The compensation system of claim 4 where the equalizer tap calculation circuit is further configured to correct the complex signal responsive to the respective corrective tap signals.

7. The compensation system of claim 1 where the equalizer tap calculation circuit is further configured to spectral smooth the complex signal.

8. The compensation system of claim 1 where the timing tracking circuit is further configured to track a phase of each of a plurality of pilot signals.

9. The compensation system of claim 8 where the timing tracking circuit is further configured to track the phase of each of the plurality of pilot signals using time averaging.

10. The compensation system of claim 1 where the phase tracking circuit is further configured to apply a respective phase and timing rotor to a plurality of pilot signals and the plurality of subcarriers of the complex signal.

11. A compensation system comprising:

means for generating a corrected complex signal by correcting at least one error introduced into a complex signal during wireless transmission, the means for generating the corrected signal comprising:

means for correcting at least one of time-constant and time-varying channel effects of the complex signal in cooperation with a means for tracking equalizer taps;

means for correcting a residual carrier frequency offset of the complex signal;

means for correcting a sampling frequency offset of the complex signal;

where the means for generating the corrected complex signal is configured to receive the complex signal from a Fast Fourier Transform (FFT) means;

where the means for generating the corrected complex signal is configured to provide the corrected complex signal to a soft decision demapper means; and where the means for correcting the at least one of the time-constant and the time-varying channel effects is configured to generate a corrective tap signal to each subcarrier associated with the complex signal by applying an algorithm to a plurality of subcarriers comprising the complex signal.

12. The compensation system of claim 11 where the algorithm is a sign least mean squares algorithm.

13. The compensation system of claim 11 where the plurality of subcarriers comprise at least 52 subcarriers.

14. The compensation system of claim 11 where the means for correcting the at least one of the time-constant and the time-varying channel effects is further configured to correct the complex signal responsive to at least one of the corrective tap signals.

15. The compensation system of claim 14 where the means for correcting the at least one of the time-constant and the time-varying channel effects is further configured to update the corrective tap signal with a running time average of a slicer error.

16. The compensation system of claim 14 where the means for correcting the at least one of the time-constant and the time-varying channel effects is further configured to correct the complex signal responsive to the respective corrective tap signals.

17. The compensation system of claim 11 where the means for correcting the at least one of the time- constant and the time-varying channel effects is further configured to spectral smooth the complex signal.

18. The compensation system of claim 11 where the means for correcting the sampling frequency offset of the complex signal is further configured to track a phase of each of a plurality of pilot signals.

19. The compensation system of claim 18 where the means for correcting the sampling frequency offset of the complex signal is further configured to track the phase of each of the plurality of pilot signals using time averaging.

20. The compensation system of claim 11 where the means for correcting the residual carrier frequency offset of the complex signal is further configured to apply a respective phase and timing rotor to a plurality of pilot signals and the plurality of subcarriers of the complex signal.

21. A method, comprising:

generating a corrected complex signal by correcting at least one error introduced into a complex signal during wireless transmission, the generating the corrected signal comprising:

correcting at least one of time-constant and time-varying channel effects of the complex signal in responsive to tracking equalizer taps;

correcting a residual carrier frequency offset of the complex signal;

correcting a sampling frequency offset of the complex signal;

where the generating the corrected complex signal includes receiving the complex signal from a Fast Fourier Transform (FFT);

where the generating the corrected complex signal includes providing the corrected complex signal to a soft decision demapper; and where the correcting the at least one of the time-constant and the time-varying channel effects includes generating a corrective tap signal to each subcarrier associated with the complex signal by applying an algorithm to a plurality of subcarriers comprising the complex signal.

22. The method of claim 21 where the algorithm is a sign least mean squares algorithm.

23. The method of claim 21 where the plurality of subcarriers comprise at least 52 subcarriers.

24. The method of claim 21 where the correcting the at least one of the time-constant and the time-varying channel effects includes correcting the complex signal responsive to at least one of the corrective tap signals.

25. The method of claim 24 where the correcting the at least one of the time-constant and the time-varying channel effects includes updating the corrective tap signal with a running time average of a slicer error.

26. The method of claim 24 where the correcting the at least one of the time-constant and the time-varying channel effects includes correcting the complex signal responsive to the respective corrective tap signals.

27. The method of claim 21 where the correcting the at least one of the time-constant and the time-varying channel effects includes spectral smoothing the complex signal.

28. The method of claim 21 where the correcting the sampling frequency offset of the complex signal includes tracking a phase of each of a plurality of pilot signals.

29. The method of claim 28 where the correcting the sampling frequency offset of the complex signal includes tracking the phase of each of the plurality of pilot signals using time averaging.

30. The method of claim 21 where the correcting the residual carrier frequency offset of the complex signal includes applying a respective phase and timing rotor to a plurality of pilot signals and the plurality of subcarriers of the complex signal.

31. A computer-readable storage medium having stored thereon, computer-executable instructions that, if executed by a device, cause the device to perform a method comprising:

generating a corrected complex signal by correcting at least one error introduced into a complex signal during wireless transmission, the generating the corrected signal comprising:

correcting at least one of time-constant and time-varying channel effects of the complex signal in responsive to tracking equalizer taps;

correcting a residual carrier frequency offset of the complex signal;

correcting a sampling frequency offset of the complex signal;

where the generating the corrected complex signal includes receiving the complex signal from a Fast Fourier Transform (FFT);

where the generating the corrected complex signal includes providing the corrected complex signal to a soft decision demapper; and where the correcting the at least one of the time-constant and the time-varying channel effects includes generating a corrective tap signal to each subcarrier associated with the complex signal by applying an algorithm to a plurality of subcarriers comprising the complex signal.

32. The computer-readable storage medium of claim 31 where the algorithm is a sign least mean squares algorithm.

33. The computer-readable storage medium of claim 31 where the plurality of subcarriers comprise at least 52 subcarriers.

34. The computer-readable storage medium of claim 31 where the correcting the at least one of the time-constant and the time-varying channel effects includes correcting the complex signal responsive to at least one of the corrective tap signals.

35. The computer-readable storage medium of claim 34 where the correcting the at least one of the time-constant and the time-varying channel effects includes updating the corrective tap signal with a running time average of a slicer error.

36. The computer-readable storage medium of claim 34 where the correcting the at least one of the time-constant and the time-varying channel effects includes correcting the complex signal responsive to the respective corrective tap signals.

37. The computer-readable storage medium of claim 31 where the correcting the at least one of the time-constant and the time-varying channel effects includes spectral smoothing the complex signal.

38. The computer-readable storage medium of claim 31 where the correcting the sampling frequency offset of the complex signal includes tracking a phase of each of a plurality of pilot signals.

39. The computer-readable storage medium of claim 31 where the correcting the sampling frequency offset of the complex signal includes tracking the phase of each of the plurality of pilot signals using time averaging.

40. The computer-readable storage medium of claim 31 where the correcting the residual carrier frequency offset of the complex signal includes applying a respective phase and timing rotor to a plurality of pilot signals and the plurality of subcarriers of the complex signal.

* * * * *

UNITED STATES PATENT AND TRADEMARK OFFICE
CERTIFICATE OF CORRECTION

PATENT NO. : 7,706,437 B2
APPLICATION NO. : 12/050144
DATED : April 27, 2010
INVENTOR(S) : Aryan Saed Page 1 of 1

It is certified that error appears in the above-identified patent and that said Letters Patent is hereby corrected as shown below:

On the Title Page, Page 1, line 2 Item (56) (Other Publications): Delete "Mulitcarrier" and replace with --Multicarrier--;

On the Title Page, Page 2, line 2 Item (56) (Other Publications): Delete "Schemem" and replace with --Scheme--;

On the Title Page, Page 2, line 7 Item (56) (Other Publications): Delete "fro" and replace with --from--; and Column 12, line 24 (Claim 17): Delete "time- constant" and replace with --time-constant--.

Signed and Sealed this

Second Day of November, 2010

David J. Kappos
*Director of the United States Patent and Trademark Office*